United States Patent Office 3,634,507
Patented Jan. 11, 1972

3,634,507
N-PHENOXYALKYL SULFAMIC ACID AMIDES
AND THEIR ALKALINE SALTS
Jacques R. Boissier, Paris, and Roger Ratouis, Saint-Cloud, France, assignors to Societe Anonyme dite: Societe Industrielle pour la Fabrication des Antibiotiques (S.I.F.A.), Puteaux, France
No Drawing. Filed June 30, 1969, Ser. No. 837,876
Claims priority, application France, July 5, 1968, 157,994; Oct. 3, 1968, 168,629
Int. Cl. C07c 143/72
U.S. Cl. 260—556 N                    5 Claims

ABSTRACT OF THE DISCLOSURE

The amides have the formula:

$$Ar\text{—}O\text{—}Z\text{—}\underset{R}{N}\text{—}SO_2NH_2 \qquad (1)$$

where Ar represents a phenyl or naphthyl radical, or a substituted phenyl or naphthyl radical. The substituent may be one or several members selected from the group consisting of halogen atoms, trifluoromethyl radical, phenyl radical, lower aliphatic hydrocarbon radicals, lower alkoxy radicals, and aliphatic hydrocarbon or alkoxy radicals linked to form a divalent radical such as polymethylene, methylenedioxy, polymethylenedioxy, Z represents a divalent saturated aliphatic hydrocarbon radical, which may be substituted by a hydroxy radical, and R represents hydrogen or a lower aliphatic hydrocarbon radical.

Amides of Formula 1 and their alkaline salts are very useful substances for human therapeutics, namely as sedative, tranquillizing, myorelaxant and anticonvulsant medicines.

Amides of Formula 1 are prepared by reacting sulfamide $H_2NSO_2NH_2$ with an amino compound of formula Ar—O—Z—NHR, wherein Ar, Z and R have the meaning above defined.

---

The invention relates to new amides of sulfamic acid, their alkaline salts and to the process for preparation thereof.

The products according to the invention have proved to be very useful in human therapeutic, namely as sedative, tranquillizing, myorelaxant and anticonvulsant medicines.

New amides of sulfamic acid, according to the invention, are compounds of the general formula:

$$Ar\text{—}O\text{—}Z\text{—}\underset{R}{N}\text{—}SO_2NH_2 \qquad (1)$$

where Ar represents a phenyl or naphthyl radical, or a substituted phenyl or naphthyl radical. The substituent may be one or several members selected from the group consisting of halogen atoms, trifluoromethyl radical, phenyl radical, saturated and unsaturated aliphatic hydrocarbon radicals containing from 1 to 3 carbon atoms, saturated and unsaturated alkoxy radicals containing from 1 to 3 carbon atoms, and aliphatic hydrocarbon or alkoxy radicals linked to form a divalent radical such as a polymethylene, methylenedioxy, polymethylenedioxy; Z represents a divalent straight or branched saturated aliphatic hydrocarbon radical containing from 2 to 5 carbon atoms, said radical may be substituted by an hydroxy radical and R represents a hydrogen atom or an aliphatic hydrocarbon radical saturated or unsaturated, straight or branched, containing from 1 to 5 carbon atoms.

According to the invention, the compounds of Formula 1 are prepared by reacting sulfamide $H_2NSO_2NH_2$ with an amino compound of formula:

$$Ar\text{—}O\text{—}Z\text{—}NHR \qquad (2)$$

where Ar, Z and R have the meaning mentioned above and isolating the resulting compound of Formula 1.

The process is preferably carried out as follows: the sulfamide is reacted in excess with regard to the quantity stoichiometrically required for the reaction with the compound of Formula 2; said reaction may be performed with or without a solvent, at a temperature of from room temperature to 150° C. It was found very advantageous to perform the reaction within a solvent such as water, ethanol, pyridine or a mixture of these solvents, at the boiling temperature of the reactive medium and first allowing to react equimolecular quantities of sulfamide and of compound of Formula 2, then adding, after an additional heating time, an equal quantity of sulfamide and continuing the heating until the completion of the reaction. When this one is over, the desired compound of Formula 1 may be isolated from the reaction mixture by concentration and extraction and purified by recrystallization.

Alkaline salts of amides of Formula 1 are prepared, according to the invention, by reacting, in about stoichiometric amounts, an alkaline hydroxide with an amide of Formula 1 in a suitable solvent and isolating the obtained salt. As alkaline hydroxide, sodium or potassium hydroxide for instance can be used, the solvent being advantageously water or a lower aliphatic alcohol.

Amides of sulfamic acid of the herein before cited general Formula 1 and their alkaline salts are very useful substances for human therapeutic, namely because of their sedative, tranquillizing, myorelaxant and anticonvulsant properties. Some of these compounds of the Formula 1 were specially studied; their central depressant activity and their muscular relaxant activity were shown according to the following experimental conditions: tests were effected in lots of 5 mice; each compound was administered by oral route, and the behavior of the animals was observed ½ hour after the administration. Then the animals were subjected to the traction test (J. R. Boissier et al. Arch. Inter. Pharmacodyn. 1961, 133, 29–49), and, after, to a maximal electroshock test. Moreover, for each tested compound a second electroshock test was carried out in another lot of animals 1½ hours after the administration.

The obtained results are mentioned in the table below.

TABLE

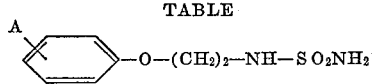

A $\diagdown$—O—$(CH_2)_2$—NH—S$O_2$N$H_2$

| Example No. | A | Dose per os (g./kg.) | Behaviour of mice after 30 minutes | Traction test: number of mice unable to hold up | Percent protection against electroshock after— ½ hr. | 1½ hr. |
|---|---|---|---|---|---|---|
| 1 | H | 0.4 | Ataxia, light hyperactivity | 5/5 | 100 | 100 |
| 7 | Cl-2 | 0.4 | Sedation, ptosis of eyelids, light ataxia | 4/5 | 100 | 100 |
| 9 | Cl-3 | 0.4 | Sedation, light ataxia, ptosis of eyelids | 4/5 | 100 | 100 |
|   |   | 0.2 | Sedation, light ptosis of eyelids | 3/5 | 60 | 60 |
| 6 | Cl-4 | 0.4 | Intense sedation, ataxia, ptosis of eyelids, 2/5 hypnosis. | 5/5 | 100 | 100 |
|   |   | 0.2 | Sedation, ataxia, ptosis of eyelids | 4/5 | 40 | 100 |
|   |   | 0.4 | Intense sedation, muscle relaxation, 1/5 hypnosis | 5/5 | 100 | 100 |
| 12 | Br-4 | 0.4 | Intense sedation, muscle relaxation, 3/10 hypnosis | 5/5 | 100 | 100 |
| 13 | F-4 | 0.2 | Normal | 2/5 | 60 | 80 |
|   |   | 0.4 | Sedation, ataxia | 5/5 | 100 | 100 |
| 21 | Cl-2, Cl-3 | 0.4 | Sedation, ptosis of eyelids, light ataxia, at 90 minutes 1/5 hypnosis. | 3/5 | 80 | 100 |
| 8 | Cl-2, Cl-4 | 0.2 | Sedation, ptosis of eyelids, ataxia | 2/5 | 80 | 40 |
|   |   | 0.4 | Sedation | 5/5 | 100 | 100 |
| 22 | Cl-2, Cl-5 | 0.4 | Sedation, light ptosis | 1/5 | 80 | 100 |
| 23 | Cl-2, Cl-6 | 0.2 | Sedation, light ptosis | 3/5 | 100 | 100 |
| 16 | CH$_3$-2, CH$_3$-3 | 0.4 | Sedation, light ptosis | 2/5 | 80 | 80 |
| 18 | CH$_3$-2, CH$_3$-5 | 0.4 | Normal | 2/5 | 100 | 100 |
| 4 | CH$_3$-2, CH$_3$-6 | 0.4 | Intense sedation, muscle relaxation, 1 hypnosis | 4/5 | 100 | 100 |
| 20 | CH$_3$-3, CH$_3$-5 | 0.4 | Sedation | 2/5 | 100 | 100 |
| 14 | CF$_3$-3 | 0.4 | Ataxia, sedation, ptosis | 4/5 | 100 | 100 |
| 26 | CH$_2$=CH—CH$_2$-2 | 0.4 | Intense sedation, ptosis, ataxia | 2/5 | 100 | 80 |
| 30 | Cl-2, Cl-4, Cl-5 | 0.4 | Sedation, ptosis, ataxia | 4/5 | 40 | 60 |

Moreover, it was observed that the 2-(p-chlorophenoxy) ethylsulfamide (described in Example 6), the 2-(m-chlorophenoxy) ethylsulfamide (described in Example 9), the 2-(p-bromophenoxy) ethylsulfamide (described in Example 12), the 2-(p-fluorophenoxy) ethylsulfamide (described in Example 13) and the 2-(2,6-dichorophenoxy) ethylsulfamide (described in Example 23) protected mice against convulsions induced by sub-cutaneous injection of 140 mg. of pentylenetetrazol from the dose of 0.25 g./kg. administered per os one hour before.

Furthermore tested products have shown to be of low toxicity, since their oral administration at a dose of 0.5 g./kg. in mice did not induce any mortality after 48 hours.

Owing to their remarkable properties, the amides of sulfamic acid of Formula 1 and their alkaline salts are very useful medicines, namely in the treatment of nevrosis, insomnia, anxiety, muscular contractures, spasms and neurovegetative disturbances. The usual dose varies according to the used product, the treated patient, the concerned complaint and the administration route; it may be, for instance, from 0.1 g. to 2 g. per day, per os in human beings. As medicines, these substances may be employed either in the form of amides of Formula 1 or in the form of pharmaceutically acceptable alkaline salts of said amides; these salts can be, for instance, sodium or potassium salts.

The present invention is also concerned with the pharmaceutical compositions which comprise as active principle one or several of the compounds of the general Formula 1 and/or of their alkaline salts. These compositions are prepared so that they can be administered through digestive, parenteral and local routes. They may be solid or liquid, and be provided in the pharmaceutical forms usually employed in human medicine, as for example tablets, coated or not, capsules, granulated substances, suppositories, solutions, parenteral preparations, ointments, creams; they are prepared according to the usual methods. The active principle or principles thereof are incorporated with usual excipients, which are normally used in those pharmaceutical compositions, such as talcum, arabic gum, lactose, starch, magnesium stearate, cocoa butter, aqueous or non aqueous vehicles, animal or vegetable fatty substances, paraffins, glycols, various wetting, dispersing and emulsifying agents and preservatives.

Compounds of Formula 2 used as starting materials can be obtained according to methods described for instance in Methoden der Organischen Chemie (Houben-Weyl), Georg Thieme Verlag—1957, 4th edition, Tome XI/1, p. 24, p. 79, p. 495, p. 650, in Synthetic Organic Chemistry— R. B. Wagner, H. D. Zook, John Wiley and Sons, 1953, p. 666, and when R is a radical 2-propynyl, according to the method mentioned in L. R. Peters, G. F. Hennion, J. Med. Chem. 1964, 7, 390.

The following non limiting examples illustrate the invention.

EXAMPLE 1

2-phenoxyethylsulfamide

A solution of 8.2 g. (0.06 mole) of 2-phenoxyethylamine and of 6.4 g. (0.066 mole) of sulfamide in a mixture of 20 ml. of water and 20 ml. of ethanol were boiled under reflux for 5 hours. Ethanol was removed by distillation under reduced pressure and 6 ml. of concentrated hydrochloric acid were added. The resulting crystals were collected and recrystallized from water, then from benzene to give 6.3 g. (48%) of 2-phenoxyethylsulfamide as white crystals. Melting point: 78° C.

Analysis.—$C_8H_{12}N_2O_3S$: Calculated (percent): C, 44.5; H, 5.6; N, 13.0; S, 14.8. Found (percent): C, 44.6; H, 5.7; N, 13.0; S, 14.9.

EXAMPLE 2

[2-hydroxy-3-(o-tolyloxy) propyl]sulfamide

A solution of 12.7 g. (0.07 mole) of 1-amino-3-o-tolyloxy-2-propanol and of 7.4 g. (0.077 mole) of sulfamide in a mixture of 35 ml. of water and 35 ml. of ethanol was boiled under reflux for 4 hours. Ethanol was removed by distillation under reduced pressure, and the resulting oil was extracted by ether. Ethereal phase was successively washed with normal hydrochloric acid, with water, with an aqueous solution of sodium carbonate and with water. Finally the ethereal solution was dried and concentrated to dryness under vacuo. The resulting crystals were recrystallized from a mixture of benzene and hexane to give 7.5 g. (41%) of [2-hydroxy-3-(o-tolyloxy) propyl]sulfamide as white crystals. Melting point: 80°–82° C.

Analysis.—$C_{10}H_{16}N_2O_4S$: Calculated (percent): C, 46.2; H, 6.2; S, 12.3. Found (percent): C, 46.2; H, 6.2; S, 12.2.

EXAMPLE 3

3-phenoxypropylsulfamide 3.25 g. (0.034 mole) of sulfamide were added to the solution of 5.1 g. (0.034 mole) of 3-phenoxypropylamine in a mixture of 20 ml. of water and 20 ml. of ethanol and the reaction mixture was boiled under reflux for 2 hours. Then 3.25 g. (0.034 mole) of sulfamide were added and heating was performed for 2 hours. Ethanol was removed by distillation under reduced pressure, the resulting crystals were collected and recrystallized from water to give 5 g. (64%) of 3-phenoxypropylsulfamide as white crystals. Melting point: 141° C.

*Analysis.*—$C_9H_{14}N_2O_3S$. Calculated (percent): C, 47.0; H, 6.1; N, 12.2; S, 13.9. Found (percent): C, 47.3; H, 6.3; N, 12.0; S, 13.9.

EXAMPLE 4

2-(2,6-xylyloxy) ethylsulfamide

Following the procedure described in Example 3, but utilizing 13.2 g. of 2-(2,6-xylyloxy) ethylamine, 9.6 g. (49%) of 2-(2,6-xylyloxy) ethylsulfamide were obtained as white crystals. Melting point: 98° C. after recrystallization from a mixture of water and ethanol.

*Analysis.*—$C_{10}H_{16}N_2O_3S$: Calculated (percent): C, 49.2; H, 6.6. Found (percent): C, 49.1; H, 6.6.

EXAMPLE 5

2-(o-methoxyphenoxy) ethylsulfamide 4.2 g. (0.044 mole) of sulfamide were added to a solution of 7.3 g. (0.044 mole) of 2-(o-methoxyphenoxy) ethylamine in a mixture of 30 ml. of water and 30 ml. of ethanol, then the resulting mixture was boiled under reflux for 2 hours. 4.2 g. (0.044 mole) of sulfamide were added and heating was performed for 2 hours. Ethanol was removed by distillation under reduced pressure. The resulting crystals were collected, washed by diluted hydrochloric acid, then by water. Then recrystallizations were made from water and afterwards from benzene to give 7.3 g. (68%) of 2-(o-methoxyphenoxy) ethylsulfamide as white crystals. Melting point: 123° C.

*Analysis.*—$C_9H_{14}N_2O_4S$: Calculated (percent): C, 43.9; H, 5.7; N, 11.4; S, 13.0. Found (percent): C, 44.0; H, 5.9; N, 11.2; S, 13.1.

EXAMPLE 6

2-(p-chlorophenoxy) ethylsulfamide

Following the procedure described in Example 5, but using 15 g. of 2-(p-chlorophenoxy) ethylamine, there were obtained 17.7 g. (80%) of 2-(p-chlorophenoxy) ethylsulfamide as white crystals. Melting point: 92° C. after recrystallization from benzene.

*Analysis.*—$C_8H_{11}ClN_2O_3S$: Calculated (percent): C, 38.3; H, 4.4; Cl, 14.1; N, 11.2; S, 12.8. Found (percent): C, 38.4; H, 4.6; Cl, 14.2; N, 11.0 S, 12.9.

EXAMPLE 7

2-(o-chlorophenoxy) ethylsulfamide

Following the procedure described in Example 5, but using 12 g. of 2-(o-chlorophenoxy) ethylamine, there were obtained 12.2 g. (69%) of 2-(o-chlorophenoxy) ethylsulfamide as white crystals. Melting point: 76° C. after recrystallization from benzene.

*Analysis.*—$C_8H_{11}ClN_2O_3S$: Calculated (percent): C, 38.3; H, 4.4; Cl, 14.1; N, 11.2; S, 12.8. Found (percent): C, 38.6; H, 4.5; Cl, 14.1; N, 11.1; S, 12.8.

EXAMPLE 8

2-(2,4-dichlorophenoxy) ethylsulfamide

Following the procedure described in Example 5, but using 18 g. of 2-(2,4-dichlorophenoxy) ethylamine, there were obtained 16.9 g. (68%) of 2-(2,4-dichlorophenoxy) ethylsulfamide as white crystals. Melting point: 88° C. after recrystallization from benzene.

*Analysis.*—$C_8H_{10}Cl_2N_2O_3S$: Calculated (percent): Cl, 24.9; N, 9.8; S, 11.2. Found (percent): Cl, 24.8; N, 9.9; S, 11.3.

EXAMPLE 9

2-(m-chlorophenoxy) ethylsulfamide

Following the procedure described in Example 5, but using 14.6 g. of 2-(m-chlorophenoxy) ethylamine, there were obtained 13.2 g. (61%) of 2-(m-chlorophenoxy) ethylsulfamide as white crystals. Melting point: 66° C. after recrystallization from benzene.

*Analysis.*—$C_8H_{11}ClN_2O_3S$: Calculated (percent): Cl, 14.1; N, 11.2; S, 12.8. Found (percent): Cl, 14.1; N, 11.0; S, 12.9.

EXAMPLE 10

N-(2-phenoxyethyl)-N-(2-propynyl) sulfamide

A mixture of 16 g. (0.091 mole) of N-(2-phenoxyethyl)-2-propynylamine and of 17.5 g. (0.182 mole) of sulfamide in 40 ml. of pyridine was boiled under reflux for 30 minutes. After cooling, the mixture was filtered and the resulting filtrate concentrated to dryness. The resulting oil was recovered by 200 ml. of ether and 100 ml. of 10% hydrochloric acid were added. Ethereal phase was washed with water, dried, and evaporated to dryness under reduced pressure. The resulting residue was recrystallized from a mixture of ethanol and water, then from water to give 9.1 g. (39%) of N - (2 - phenoxyethyl)-N-(2 - propynyl) sulfamide as white crystals. Melting point: 93° C.

*Analysis.*—$C_{11}H_{14}N_2O_3S$: Calculated (percent): C, 52.0; H, 5.6; S, 12.6. Found (percent): C, 52.1; H, 5.6; S, 12.6.

The starting material N - (2 - phenoxyethyl)-2-propynylamine can be obtained as follows:

(a) N - (2 - phenoxyethyl) - 2 - bromoallylamine.— A solution of 32.6 g. (0.163 mole) of 2,3-dibromopropene in 15 ml. of ether was added dropwise, while stirring and at a temperature of −10° C., to a solution of 44.7 g. (0.326 mole) of 2-phenoxyethylamine in 65 ml. of ether. The mixture was kept at room temperature for 22 hours with stirring. The resulting crystals of 2-phenoxyethylamine hydrobromide were separated by filtration, ether was removed by distillation under reduced pressure and the residue was distilled to give 31 g. (74%) of N-(2-phenoxyethyl) - 2 - bromoallylamine as a colourless oil. Boiling point: 96°–100° C. at 0.15 mm.

*Analysis.*—$C_{11}H_{14}BrNO$: Calculated (percent): Br, 31.2. Found (percent): Br, 31.5.

(b) N - (2 - phenoxyethyl) - 2 - propynylamine.—45 g. (0.176 mole) of N - (2 - phenoxyethyl) - 2 - bromoallylamine were added dropwise to a sodium amide suspension in liquid ammonia, prepared from 12.15 g. (0.528 at.-g.) of sodium and about 1 liter of liquid ammonia. After refluxing for 6½ h., 50 ml. of toluene were added slowly and the reaction mixture was allowed to stand for about 12 hours. Then 10 ml. of water were added dropwise with external cooling, then 100 ml. of toluene and 100 ml. of water were added. Aqueous phase was washed by toluene, toluenic phases were collected and washed with water; then toluene was removed by concentration under reduced pressure. The residue was distilled to give 16 g. (52%) of N - (2 - phenoxyethyl)-2-propynylamine as a colourless oil. Boiling point: 80°–83° C. at 0.05 mm.

*Analysis.*—$C_{11}H_{13}NO$: Calculated (percent): C, 75.4; H, 7.5; N, 8.0. Found (percent): C, 75.3; H, 7.7; N, 8.1.

EXAMPLE 11

2-(p-tolyloxy) ethylsulfamide

Following the procedure described in Example 5, but using 11.7 g. of 2 - (p - tolyloxy) ethylamine, 9.7 g. (54%) of 2 - (p - tolyloxy) ethylsulfamide were obtained as white crystals. Melting point: 95°–96° C. after recrystallization from benzene.

*Analysis.*—$C_9H_{14}N_2O_3S$: Calculated (percent): C, 46.9; H, 6.2; N, 12.2; S, 13.9. Found (percent): C, 47.1; H, 6.2; N, 12.0; S, 13.9.

EXAMPLE 12

2-(p-bromophenoxy) ethylsulfamide

Following the procedure described in Example 5, but using 14.5 g. of 2-(p-bromophenoxy) ethylamine, there were obtained 15.2 g. (77%) of 2-(p-bromophenoxy) ethylsulfamide as white crystals. Melting point: 122° C. after recrystallization from benzene.

Analysis.—$C_8H_{11}BrN_2O_3S$: Calculated (percent): C, 32.5; H, 3.8; Br, 27.1; N, 9.5; S, 10.9. Found (percent): C, 32.8; H, 3.9; Br, 27.1; N, 9.4; S, 10.8.

EXAMPLE 13

2-(p-fluorophenoxy) ethylsulfamide

Following the procedure described in Example 5, but using 10.9 g. of 2-(p-fluorophenoxy) ethylamine, there were obtained 8 g. (48%) of 2-(p-fluorophenoxy) ethylsulfamide as white crystals. Melting point: 68°–69° C. after recrystallization from benzene.

Analysis.—$C_8H_{11}FN_2O_3S$: Calculated (percent): C, 41.0; H, 4.7; N, 12.0; S, 13.7. Found (percent): C, 41.4; H, 4.9; N, 11.8; S, 13.7.

EXAMPLE 14

2-(m-trifluoromethylphenoxy) ethylsulfamide (1°) 2-bromoethyl m-trifluoromethylphenyl ether.—A mixture of 64 g. (0.4 mole) of m-trifluoromethylphenol, of 80 g. (0.43 mole) of 1,2-dibromoethane and of 48 ml. of water was boiled under reflux, with stirring. Then a solution of 15.2 g. (0.38 mole) of sodium hydroxide in 32 ml. of water was added dropwise. When this addition was over, heating was performed for 5 hours, then the mixture was cooled and extracted with ether. Ethereal solution was washed by diluted sodium hydroxide then by water. Ethereal phase was dried and ether was removed by distillation under reduced pressure. The residue was distilled to give 62.7 g. (58%) of 2-bromoethyl m-trifluoromethylphenyl ether as a colourless oil. Boiling point: 62°–63° C. at 0.2 mm.

Analysis.—$C_9H_8BrF_3O$: Calculated (percent): Br, 29.7. Found (percent): Br, 29.6.

(2°) N-[2-(m-trifluoromethylphenoxy)ethyl]phthalimide.—The mixture of 62.5 g. (0.23 mole) of 2-bromoethyl m-trifluoromethylphenyl ether, of 43 g. (0.23 mole) of potassium phthalimide and of 150 ml. of dimethylformamide was boiled under reflux for 3 hours. After cooling, the reaction mixture was poured into 1 l. of ice water and the resulting precipitate was collected. After recrystallization from ethanol, 35 g. (47%) of N-[2-(m-trifluoromethylphenoxy)ethyl]phthalide were obtained as white crystals. Melting point: 98° C.

(3°) 2 - (m - trifluoromethylphenoxy)ethylamine.—A solution of 34 g. (0.106 mole) of N-[2-(m-trifluoromethylphenoxy)ethyl]phthalimide in 500 ml. of ethanol was boiled under reflux and 53 g. of 98% hydrazine hydrate was added dropwise. When the addition was over, heating was performed for 2 hours. The reaction mixture was cooled, the resulting precipitate was filtered and ethanol was removed from the filtrate. Residue was recovered by ether and, after filtration, ether was removed to give 11.8 g. (54%) of 2-(m-trifluoromethylphenoxy) ethylamine as a colourless oil.

Analysis.—$C_9H_{10}F_3NO$, Calculated (percent): C, 52.7; H, 4.9; N, 6.8. Found (percent): C, 52.6; H, 5.1; N, 6.8.

(4°) 2 - (m - trifluoromethylphenoxy)ethylsulfamide.—Following the procedure described in Example 5, but using 11.5 g. of 2-(m-trifluoromethylphenoxy)ethylamine, there were obtained 9.4 g. (59%) of 2-(m-trifluoromethylphenoxy)ethylsulfamide as white crystals. Melting point: 56°–57° C. after recrystallization from a mixture of benzene and hexane.

Analysis.—$C_9H_{11}F_3N_2O_3S$: Calculated (percent): C, 38.0; H, 3.9; N, 9.9. Found (percent): C, 38.5; H, 4.0; N, 9.6.

EXAMPLE 15

2-(p-biphenylyloxy) ethylsulfamide

Following the procedure described in Example 3, but using 11.5 g. of 2-(p-biphenylyloxy) ethylamine, there were obtained 5.8 g. (37%) of 2-(p-biphenylyloxy) ethylsulfamide as white crystals. Melting point: 164° C. after recrystallization from ethanol.

Analysis.—$C_{14}H_{16}N_2O_3S$: Calculated (percent): C, 57.5; H, 5.5; N, 9.6; S, 11.0. Found (percent): C, 57.5; H, 5.5; N, 9.4; S, 11.0.

EXAMPLE 16

2-(2,3-xylyloxy) ethylsulfamide

The mixture of 44.8 g. (0.195 mole) of 2-bromoethyl (2,3-xylyl) ether, of 36.2 g. (0.195 mole) of potassium phthalimide and of 10 ml. of dimethylformamide was boiled under reflux for 15 hours. The reaction mixture was cooled, poured in 500 ml. of ice water and the resulting precipitate was collected. This precipitate was recrystallized from ethanol to give 30.6 g. of white crystals which were dissolved in 600 ml. of ethanol. The thus resulting solution was boiled under reflux and 52 g. of 98% hydrazine hydrate were added. When the addition was over, heating was performed for 2 hours. The reaction mixture was cooled, the resulting precipitate filtered and ethanol was eliminated from the filtrate. The residue was recovered by ether, the obtained ethereal solution was filtered. Ether was removed from the filtrate to give 10.2 g. of a colourless oil which was dissolved in a mixture of 35 ml. of water and 35 ml. of ethanol. Then, using on the whole 11.6 g. of sulfamide and following the procedure described in Example 5, 9.7 g. (20%) of 2-(2,3-xylyloxy) ethylsulfamide were obtained as white crystals. Melting point: 136°–137° C. after recrystallization from benzene.

Analysis.—$C_{10}H_{16}N_2O_3S$: Calculated (percent): C, 49.2; H, 6.6; N, 11.5; S, 13.1. Found (percent): C, 49.3; H, 6.6; N, 11.2; S, 13.0.

EXAMPLE 17

2-(2,4-xylyloxy) ethylsulfamide

Following the procedure described in Example 5, but using 10 g. of 2-(2,4-xylyloxy) ethylamine, 9.2 g. (63%) of 2-(2,4-xylyloxy) ethylsulfamide were obtained as white crystals. Melting point: 119°–120° C. after recrystallization from benzene.

Analysis.—$C_{10}H_{16}N_2O_3S$: Calculated percent: C, 49.2; H, 6.6; N, 11.5; S, 13.1. Found (percent): C, 49.2; H, 6.6; N, 11.3; S, 13.1.

EXAMPLE 18

2-(2,5-xylyloxy) ethylsulfamide

Following the procedure described in Example 5, but using 11.3 g. of 2-(2,5-xylyloxy) ethylamine, 7.8 g. (46%) of 2-(2,5-xylyloxy) ethylsulfamide were obtained as white crystals. Melting point: 86° C. after recrystallization in a mixture of water and ethanol.

Analysis.—$C_{10}H_{16}N_2O_3S$: Calculated (percent): C, 49.2; H, 6.6; N, 11.5; S, 13.1. Found (percent): C, 49.3; H, 6.6; N, 11.2; S, 13.0.

EXAMPLE 19

2-(3,4-xylyloxy) ethylsulfamide

Following the procedure described in Example 5, but using 18.8 g. of 2-(3,4-xylyloxy) ethylamine, 17.7 g. (63%) of 2-(3,4-xylyloxy) ethylsulfamide were obtained as white crystals. Melting point: 85°–86° C. after recrystallization from benzene.

Analysis.—$C_{10}H_{16}N_2O_3S$: Calculated (percent): C, 49.2; H, 6.6; N, 11.5; S, 13.1. Found (percent): C, 49.1; H, 6.8; N, 11.2; S, 13.1.

EXAMPLE 20

2-(3,5-xylyloxy) ethylsulfamide

Following the procedure described in Example 5, but using 10.9 g. of 2-(3,5-xylyloxy) ethylamine, 10.6 g. (66%) of 2-(3,5-xylyloxy) ethylsulfamide were obtained as white crystals. Melting point: 106° C. after recrystallization from benzene.

Analysis.—$C_{10}H_{16}N_2O_3S$: Calculated (percent): C, 49.2; H, 6.6; N, 11.5; S, 13.1. Found (percent): C, 49.2; H, 6.4; N, 11.3; S, 13.0.

EXAMPLE 21

2-(2,3-dichlorophenoxy) ethylsulfamide (1°) 2-bromoethyl (2,3-dichlorophenyl) ether.—Following the procedure described in the first paragraph of Example 14, but using 16.3 g. (0.1 mole) of 2,3-dichlorophenol, there were obtained, after two distillations, 13.3 g. (50%) of 2-bromoethyl (2,3-dichlorophenyl) ether as a colourless liquid which crystallized by cooling. Boiling point: 97°–100° C. at 0.15 mm. Melting point: 52° C. on a hot stage microscope.

Analysis.—$C_8H_7BrClO_2$: Calculated (percent): Br, 29.6; Cl, 26.3. Found (percent): Br, 29.7; Cl, 26.0.

(2°) 2-(2,3-dichlorophenoxy) ethylsulfamide.—A mixture of 47.7 g. (0.177 mole) of 2-bromoethyl (2,3-dichlorophenyl) ether, of 32.8 g. (0.177 mole) of potassium phthalimide and of 190 ml. of dimethylformamide was boiled under reflux for 15 hours. The reaction mixture was cooled, poured in 500 ml. of ice water and the resulting precipitate was collected. The said precipitate was recrystallized from ethanol; 30 g. of white crystals were obtained and dissolved in 400 ml. of ethanol. The resulting solution was boiled under reflux and 44.7 g. of 98% hydrazine hydrate were added. When the addition was over, heating was performed for 2 hours. The reaction mixture was cooled, the resulting precipitate was filtered and ethanol was removed from the filtrate. The residue was recovered by ether, ethereal solution was filtered and ether was driven off from the filtrate to give 13.9 g. of a colourless oil which was dissolved in a mixture of 30 ml. of water and 30 ml. of ethanol. Following then the procedure described in Example 5 and using on the whole 13 g. of sulfamide, 7.7 g. (15%) of 2-(2,3-dichlorophenoxy) ethylsulfamide were obtained as white crystals. Melting point: 128° C. after recrystallization from benzene.

Analysis.—$C_8H_{10}Cl_2N_2O_3S$: Calculated (percent): C, 33.7; H, 3.5; Cl, 24.9; N, 9.8; S, 11.2. Found (percent): C, 33.8; H, 3.6; Cl, 25.0; N, 97; S, 11.2.

EXAMPLE 22

2-(2,5-dichlorophenoxy) ethysulfamide

Following the procedure described in Example 5, but using 18.1 g. of 2-(2,5-dichlorophenoxy) ethylamine, there were obtained 17.6 g. (70%) of 2-(2,5-dichlorophenoxy) ethylsulfamide as white crystals. Melting point: 118° C. after recrystallization from benzene.

Analysis.—$C_8H_{10}Cl_2N_2O_3S$: Calculated (percent): C, 33.7; H, 3.5; Cl, 24.9; N, 9.8; S, 11.2. Found (percent): C, 34.0; H, 3.6; Cl, 24.9; N, 9.8; S, 11.1.

EXAMPLE 23

2-(2,6-dichlorophenoxy) ethylsulfamide

Following the procedure described in Example 5, but using 22.3 g. of 2-(2,6-dichlorophenoxy) ethylamine, there were obtained 18.9 g. (61%) of 2-(2,6-dichlorophenoxy) ethylsulfamide as white crystals. Melting point: 117° C. after recrystallization from benzene.

Analysis. $C_8H_{10}Cl_2N_2O_3S$: Calculated (percent): C, 33.7; H, 3.5; Cl, 24.9; N, 9.8; S, 11.2. Found (percent): C, 33.7; H, 3.6; Cl, 24.9; N, 9.7; S, 11.3.

EXAMPLE 24

2-(3,4-dichlorophenoxy) ethylsulfamide (1)° N-[2-(3,4-dichlorophenoxy) ethyl] phthalimide.—A mixture of 40.8 g. (0.151 mole) of 2-bromoethyl (3,4-dichlorophenyl) ether, of 28 g. (0.151 mole) of potassium phthalimide and of 100 ml. of dimethylformamide was boiled under reflux for 15 hours. The reaction mixture was cooled and poured in 500 ml. of ice water, the resulting crystals were collected and recrystallized from ethanol to give 17.2 g. (34%) of N-[2-(3,4-dichlorophenoxy) ethyl] phthalimide as white crystals. Melting point: 140° C.

Analysis.—$C_{16}H_{11}Cl_2N_2O_3$: Calculated (percent): C, 57.2; H, 3.3; N, 4.2. Found (percent): C, 57.2; H, 3.4; N, 4.1.

(2°) 2-(3,4-dichlorophenoxy) ethylsulfamide.—A solution of 17.1 g. of N-[2-(3,4-dichlorophenoxy) ethyl] phthalimide in 500 ml. of ethanol was boiled under reflux and added by 25.5 g. of 98% hydrazine hydrate. When the addition was over heating was performed for 2 hours. The reaction mixture was cooled, the precipitate was filtered and ethanol was eliminated from the filtrate. The residue was recovered by ether, ethereal solution was filtered and ether was eliminated from the filtrate to give 10 g. of a pale-yellow oil that was dissolved in a mixture of 30 ml. of water and 30 ml. of ethanol. Using on the whole 9.9 g. of sulfamide and proceeding then as described in Example 5, 6.3 g. (42%) of 2-(3,4-dichlorophenoxy) ethylsulfamide as white crystals were obtained. Melting point: 58° C. on a hot stage microscope after recrystallization from benzene.

Analysis.—$C_8H_{10}Cl_2N_2O_3S$: Calculated (percent): C, 33.7; H, 3.5; Cl, 24.9; N, 9.8; S, 11.2. Found (percent): C, 34.0; H, 3.6; Cl, 24.8; N, 9.7; S, 10.9.

EXAMPLE 25

2-(2-isopropyl 5-methyl phenoxy) ethylsulfamide.

Following the procedure described in Example 3, but using 7 g. of 2-(2-isopropy 5-methyl phenoxy) ethylamine, there were obtained 6 g. (61%) of 2-(2-isopropyl 5-methyl phenoxy) ethylsulfamide as white crystals. Melting point: 98°–99° C. after recrystallization from benzene.

Analysis.—$C_{12}H_{20}N_2O_3S$: Calculated (percent): C, 52.9; H, 7.4; N, 10.3; S, 11.8. Found (percent): C, 52.7; H, 7.4; N, 10.1; S, 11.7.

EAXMPLE 26

2-(o-allylphenoxy) ethylsulfamide

Following the procedure described in Example 3, but using 6.8 g. of 2-(o-allylphenoxy) ethylamine, there were obtained 2-(o-allylphenoxy) ethylsulfamide as white crystals. Melting point: 74° C. after recrystallization in a mixture of water and ethanol.

Analysis.—$C_{11}H_{16}N_2O_3S$: Calculated (percent): C, 51.5; H, 6.3; S, 12.5. Found (percent): C, 51.6; H, 6.5; S, 12.4.

EXAMPLE 27

N-methyl-N-(2-phenoxyethyl) sulfamide

Following the procedure described in Example 10, but using 16.7 g. of N-methyl-2-phenoxyethylamine, there were obtained N-methyl-N-(2-phenoxyethyl) sulfamide as white crystals. Melting point: 95° C. after recrystallization from ethanol.

Analysis.—$C_9H_{14}N_2O_3S$: Calculated (percent): C, 46.9; H, 6.1; N, 12.2; S, 13.9. Found (percent): C, 47.0; H, 6.3; N, 12.0; S, 13.8.

EXAMPLE 28

Sodium salt of (1-methyl-2-phenoxyethyl) sulfamide 7.7 g. (0.08 mole) of sulfamide were added to a solution of 12.1 g. (0.08 mole) of 1-methyl-2-phenoxyethylamine in a mixture of 30 ml. of water and 30 ml. of ethanol and the reaction mixture was boiled under reflux for 2 hours. 7.7 g. (0.08 mole) of sulfamide were added and heating was performed for 2 hours. Ethanol was removed by distillation under reduced pressure and the resulting oil was extracted with benzene. The benzenic solution was washed with diluted hydrochloric acid then with water, and dried. Benzene was removed by distillation under reduced pressure. The resulting oil (7.8 g.) was dissolved in an ethanolic solution of 1.37 g. of OHNa. Ethanol was removed by distillation under reduced pressure. The resulting crystals were washed with a little of anhydrous ether to give the sodium salt of (1-methyl-2-phenoxyethyl)sulfamide, as white crystals. Melting point: 162° C.

Analysis.—$C_9H_{13}N_2NaO_3S$: Calculated (percent): C, 42.8; H, 5.2; S, 12.7. Found (percent): C, 42.6; H, 5.3; S, 12.8.

EXAMPLE 29

2-(2,4,6-trichlorophenoxy) ethylsulfamide

Following the procedure described in Example 3, but using 9 g. of 2-(2,4,6-trichlorophenoxy) ethylamine, there were obtained 5.8 g. (48%) of 2-(2,4,6-trichlorophenoxy) ethylsulfamide as white crystals. Melting point: 98°–99° C. after recrystallization in a mixture of water and ethanol.

Analysis.—$C_8H_9Cl_3N_2O_3S$: Calculated (percent): C, 30.1; H, 2.8; Cl, 33.3; N, 8.8; S, 10.0. Found (percent): C, 30.1; H, 2.8; Cl, 33.2; N, 8.5; S, 10.3.

EXAMPLE 30

2-(2,4,5-trichlorophenoxy) ethylsulfamide

Following the procedure described in Example 3, but using 14.8 g. of 2-(2,4,5-trichlorophenoxy) ethylamine there were obtained 11.7 g. (60%) of 2-(2,4,5-trichlorophenoxy) ethylsulfamide as white crystals. Melting point: 99°–100° C. after recrystallization from benzene.

Analysis.—$C_8H_9Cl_3N_2O_3S$: Calculated (percent): C, 30.1; H, 2.8; Cl, 33.3; N, 8.8; S, 10.0. Found (percent): C, 30.1; H, 2.8; Cl, 33.2; N, 8.5; S, 10.0.

EXAMPLE 31

Tablets were prepared which corresponded to the formula:

| | G. |
|---|---|
| 2-phenoxyethylsulfamide | 0.200 |
| Excipient s.q. for 1 tablet of | 0.400 |

(Excipient can be: lactose, starch, talcum, magnesium stearate).

EXAMPLE 32

Tablets were prepared which corresponded to the formula:

| | G. |
|---|---|
| 2-(p-chlorophenoxy) ethylsulfamide | 0.200 |
| Excipient s.q. for 1 tablet of | 0.400 |

(Excipient can be: lactose, starch, talcum, magnesium stearate).

EXAMPLE 33

Tablets were prepared which corresponded to the formula:

| | G. |
|---|---|
| 2-(p-bromophenoxy) ethylsulfamide | 0.200 |
| Excipient s.q. for 1 tablet of | 0.400 |

(Excipient can be: lactose, starch, talcum, magnesium stearate).

EXAMPLE 34

Tablets were prepared which corresponded to the formula:

| | G. |
|---|---|
| 2-(p-fluorophenoxy) ethylsulfamide | 0.200 |
| Excipient s.q. for 1 tablet of | 0.400 |

(Excipient can be: lactose, starch, talcum, magnesium stearate).

EXAMPLE 35

Tablets were prepared which corresponded to the formula:

| | G. |
|---|---|
| 2-(2,3-dichlorophenoxy) ethylsulfamide | 0.200 |
| Excipient s.q. for 1 tablet of | 0.400 |

(Excipient can be: lactose, starch, talcum, magnesium stearate).

EXAMPLE 36

Tablets were prepared which corresponded to the formula:

| | G. |
|---|---|
| 2-(2,5-dichlorophenoxy) ethylsulfamide | 0.200 |
| Excipient s.q. for 1 tablet of | 0.400 |

(Excipient can be: lactose, starch, talcum, magnesium stearate).

EXAMPLE 37

Suppositories were prepared which corresponded to the formula:

| | G. |
|---|---|
| 2-(p-chlorophenoxy) ethylsulfamide | 0.100 |
| Excipient s.q. for 1 suppository of | 3 |

EXAMPLE 38

Parenteral preparations were prepared which corresponded to the formula:

2-phenoxyethylsulfamide—0.200 g.
Excipient—5 ml.

We claim:
1. A compound selected from the group consisting of amides of sulfamic acid and their alkaline salts, said amides having the formula:

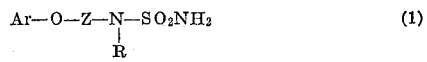

where Ar represents a member selected from the group consisting of phenyl and substituted phenyl radicals, the substituents being at least one member selected from the group consisting of halogen, trifluoromethyl, phenyl, allyl, alkyl and alkoxy said alkyl and alkoxy containing at the most 3 carbon atoms, Z is a member selected from the group consisting of alkylene and hydroxy alkylene radicals containing from 2 to 5 carbon atoms, and R represents a member selected from the group consisting of hydrogen, alkyl and alkynyl radicals containing at the most 3 carbon atoms.

2. A compound as defined in claim 1, wherein Ar represents a phenyl radical, Z is an ethylene radical and R is hydrogen.

3. A compound as defined in claim 1, wherein Ar represents a p-halogenophenyl radical, Z is an ethylene radical and R is hydrogen.

4. A compound as defined in claim 1, wherein Ar represents a p-chlorophenyl radical, Z is an ethylene radical and R is hydrogen.

5. A compound as defined in claim 1, wherein A represents a dihalogenophenyl radical, Z is an ethylene radical and R is hydrogen.

References Cited

UNITED STATES PATENTS

| 2,075,359 | 3/1937 | Salzberg et al. | 424—250 |
| 3,509,211 | 4/1970 | Ilvespoa et al. | 260—556 |

FOREIGN PATENTS

| 39,18M | 2/1966 | France | 260—556 |

HENRY R. JILES, Primary Examiner

S. D. WINTERS, Assistant Examiner

U.S. Cl. X.R.

260—340.5, 570.7; 424—321

PO-1050
(5/69)

UNITED STATES PATENT OFFICE
CERTIFICATE OF CORRECTION

Patent No. 3,634,507            Dated January 11, 1972

Inventor(s) Jacques Robert Boissier and Roger Ratouis

It is certified that error appears in the above-identified patent and that said Letters Patent are hereby corrected as shown below:

In the heading of the patent, "assignors to Societe Industrielle pour la Fabrication des Antibiotiques (S.I.F.A.), Puteaux, France" should be --Roussel-UCLAF, Paris, France--.

Column 8, line 12, "10 ml" should be --100 ml--.

Column 9, line 44, "N, 97" should be --N, 9.7--.

Column 11, line 33, "S, 10.0" should be --S, 10.2--.

Signed and sealed this 8th day of August 1972.

(SEAL)
Attest:

EDWARD M. FLETCHER, JR.       ROBERT GOTTSCHALK
Attesting Officer               Commissioner of Patents